United States Patent [19]
Saiki

[11] 4,155,536
[45] May 22, 1979

[54] SEAT RING ASSEMBLY FOR A VALVE

[75] Inventor: Makoto Saiki, Hiroshima, Japan

[73] Assignee: The Japan Steel Works, Ltd., Tokyo, Japan

[21] Appl. No.: 833,212

[22] Filed: Sep. 14, 1977

[30] Foreign Application Priority Data

May 30, 1977 [JP] Japan .............................. 52-68638[U]

[51] Int. Cl.² .............................................. F16K 1/00
[52] U.S. Cl. .................................... 251/332; 251/317; 251/174
[58] Field of Search ................ 251/332, 172, 174, 315, 251/317, 328, 171

[56] References Cited
U.S. PATENT DOCUMENTS

| | | | |
|---|---|---|---|
| 2,868,497 | 1/1959 | Graham | 251/172 |
| 3,109,623 | 11/1963 | Bryant | 251/172 |
| 3,301,523 | 1/1967 | Lowrey | 251/332 X |
| 3,335,999 | 8/1967 | Lowrey | 251/174 X |
| 3,472,270 | 10/1969 | Masheder | 251/172 X |
| 3,497,177 | 2/1970 | Hulsey | 251/172 |
| 3,667,727 | 6/1972 | Bowden | 251/315 X |

Primary Examiner—Harold W. Weakley
Attorney, Agent, or Firm—Sughrue, Rothwell, Mion, Zinn and Macpeak

[57] ABSTRACT

A seat ring assembly in a ball valve or a gate valve provides a primary metal-to-metal seal and a secondary metal-to-synthetic resin seal. The primary seal is accomplished by direct contact between the valve body and the interior conical surface of the seat ring. The secondary seal is made by contact between the valve body and a synthetic resin seat ring insert. The synthetic resin seat ring insert is slidably inserted into an annular groove cut into the conical surface of the seat ring. A compressible seal member is inserted between the bottom surface of the annular groove and the synthetic resin seat ring insert to urge the seat ring insert into contact with the valve body. An additional compressible seal member is inserted into an annular space defined by an inner cylindrical surface of the valve casing and a facing cylindrical surface of the seat ring.

6 Claims, 3 Drawing Figures

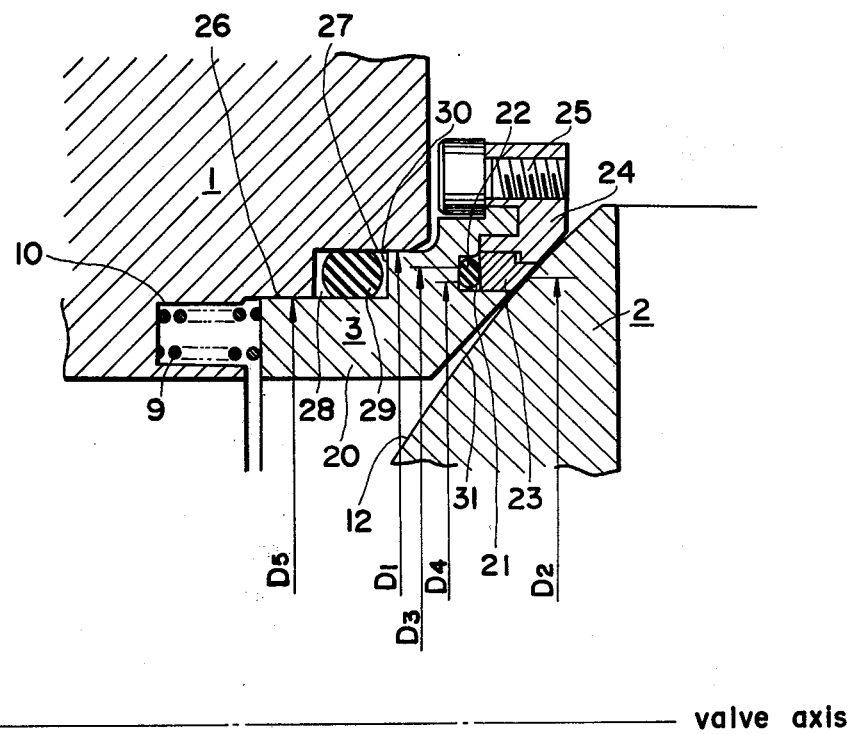

SEAT RING ASSEMBLY FOR A VALVE

BACKGROUND OF THE INVENTION

The present invention generally relates to an improved seat ring assembly for ball valves or gate valves.

Conventional seat ring assemblies for ball valves or gate valves are characterized by a synthetic resin seat ring insert which is fixedly inserted into an annular groove cut in the interior conical surface of the seat ring. The synthetic resin seat ring insert projects beyond the interior conical surface of the seat ring and sealingly engages the external surface of the valve body. The contact between the synthetic resin seat insert and the valve body, however, is often not sufficient to provide a good seal. Moreover, when the synthetic resin seat ring insert is worn due to friction or damaged and even broken by a foreign object, the seal is greatly reduced or eliminated.

SUMMARY OF THE DISCLOSURE

An object of the present invention is to provide a seat ring device in which durability, mechanical accuracy and the sealing effect are improved, and by which the drawbacks inherent to the conventional seat ring assemblies for ball valves or gate valves are overcome and in which the seal effect is not degraded even due to the partial abrasion and destruction of the synthetic resin seat ring insert.

A further object of the present invention is to provide a seat ring assembly in which when the cavity pressure is lower than the upstream and/or the downstream pressures, a sufficient seal effect is obtained by the same operation as the conventional assemblies, and even when the cavity pressure is larger than the upstream and/or the down stream pressures, a sufficient seal effect is obtained by utilizing the pressure difference therebetween.

A still further object of the present invention is to provide a seat ring assembly which prevents the leakage due to the gap between the synthetic resin seat ring insert and the groove which receives it.

These and other objects of the invention are attained by providing an improved seat ring assembly which makes a primary metal-to-metal seal and a secondary metal-to-synthetic resin seal. The primary seal is accomplished by direct contact between the valve body and the interior conical surface of the seat ring. The secondary seal is made by contact between the valve body and a synthetic resin seat ring insert. The synthetic resin seat ring insert is slidably inserted into an annular groove cut into the conical surface of the seat ring. A compressible seal member is inserted between the bottom surface of the annular groove and the synthetic resin seat ring insert to urge the seat ring insert into contact with the valve body.

BRIEF DESCRIPTION OF THE DRAWINGS

In the drawings:

FIG. 3 is a detailed fragmentary cross-sectional view of the improved seat ring assembly according to the present invention.

DETAILED DESCRIPTION OF A CONVENTIONAL SEAT RING ASSEMBLY

Figure 1:
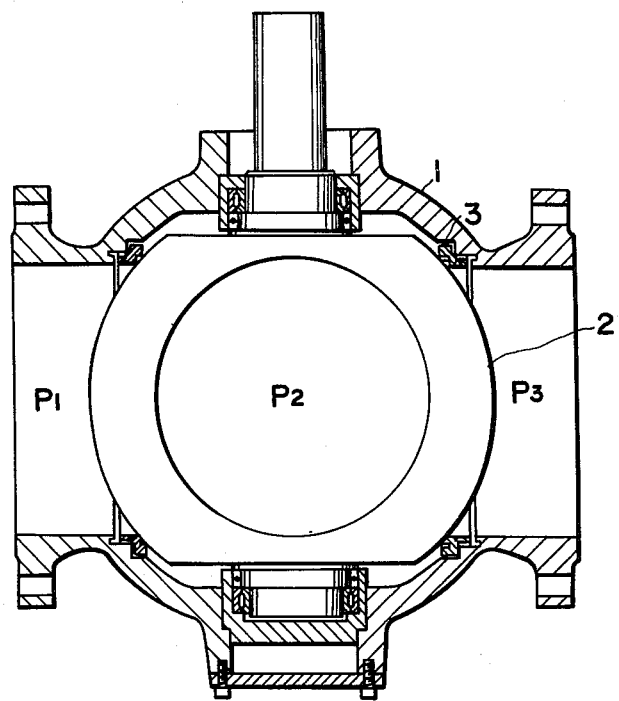
FIG. 1 is a cross-sectional view of a ball valve employing a conventional seat ring assembly.
Figure 2:
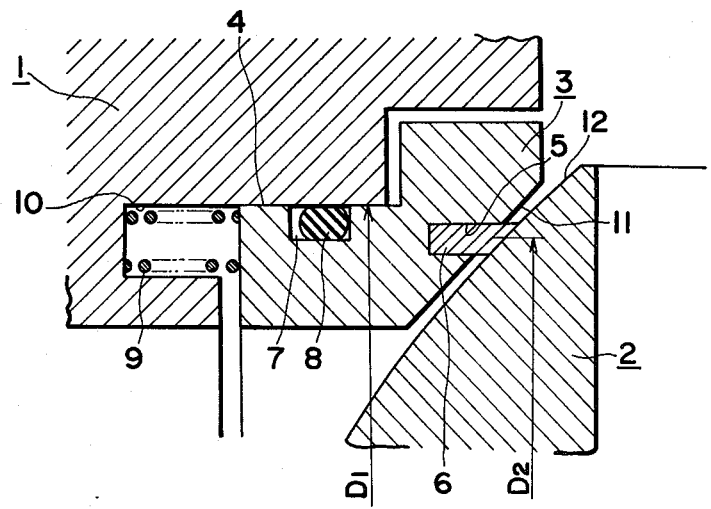
FIG. 2 is a detailed fragmentary cross-sectional view of the conventional seat ring assembly.

In order to better understand the present invention and appreciate the improvements it affords, there is first described a conventional seat ring assembly with reference to FIGS. 1 and 2.

Generally, a ball valve shown in FIG. 1 is equipped with a seat ring device shown in FIG. 2. In the seat ring device, a seat ring 3 is provided between a valve casing 1 and a valve body 2 and can be slid longitudinally in a small range in the fluid flow direction along cylindrical surface 4 which is formed circumferentially in the interior of the valve casing. A seat ring insert 6 which is made of a synthetic resin or the like is fixedly inserted into an annular groove 5 which is formed in the seat ring 3 so as to face the valve body. A seal member 8 is also inserted into another groove 7 which is formed in the seat ring 3 and which faces the interior cylindrical surface 4 of the casing so that the gap between the interior cylindrical surface 4 and the seat ring 3 is sealed. In this construction, the internal diameter $D_1$ of the cylindrical surface 4 is larger than the means (average) diameter $D_2$ of the contacting portion between the seat ring insert 6 and the valve body 2 and further, compression springs 9 which press the seat ring 3 to the right in FIG. 2 are provided in a groove 10 in the valve casing 1.

In the above conventional construction of the seat ring assembly, in case the relation, $P_2 > P_2$ and or $P_3 > P_2$ is established, where the upstream pressure of the valve is $P_1$, the cavity pressure of the valve is $P_2$ and the down stream pressure of the valve is $P_3$, when the valve is closed, the seat ring 3 is pressed to the valve body 2 not only by the action of the springs 9 but also by a force Fp due to the pressure difference therebetween. The force Fp due to the pressure difference is represented as follows:

$$Fp = \pi/4 \, (D_1^2 - D_2^2) \cdot (P_1 - P_2)$$

or $$Fp = \pi/4 \, (D_1^2 - D_2^2) \cdot (P_3 - P_2)$$

As the result, the seat ring insert 6 is pressed to the valve body 2 so that the gap between the seat ring 3 and the valve body 2 is sealed, and the sealing of the high and the low pressure sides of the fluid flow are accomplished.

However, the above conventional seat ring assembly has the following drawbacks. The seat ring insert 6 projects slightly from the conical beveled surface 11 of the seat ring 3. Even when the seat ring 3 is fully pressed to the valve body 2, the sealing is accomplished mainly by the contact between the seat ring insert 6 and the external surface 12 of the valve body 2 and the compression force on the seat ring insert 6 can be often excessive. Therefore, when the seat ring insert 6 is partially worn out due to the friction against the external surface 12 or when it is broken due to foreign objects, the seal effect is largely reduced or worst of all eliminated. This drawback is due to the fact that the seat ring insert 6 is fixedly inserted into the seat ring 3 so that the sliding movement of the insert with respect to the fluid flow is extremely short and the fact that the seal is accomplished mainly on account of the contact between the external surface 12 of the valve body 2 and the seat ring insert 6. Further, in the conventional seat ring assembly, there is sometimes a problem of leakage through the gap between the seat ring insert 6 and the annular groove 5. Furthermore, in case the relation, $P_1 < P_2$ and/or $P_3 < P_2$, which is opposite to the aforementioned relation, is established in the above conventional seat ring assembly, the force of the pressure difference is such as to weaken the pressing force due to the springs 9. Therefore, the seal effect is degraded or completely eliminated.

DETAILED DESCRIPTION OF THE INVENTION

Referring to FIG. 3, the preferred embodiment of the present invention will be described. As shown in FIG. 3, the seat ring 3 mainly consists of an inner seat ring 20 which has a flanged portion. An annular groove 21 is formed in the inner seat ring in the conical beveled surface 31 in the longitudinal direction. A seat ring insert 23 made of synthetic resin such as Teflon (reg. TM of du Pont) is inserted into the groove 21. An annular elastic seal member 22 which can be deformed in its radial direction is received in a bottom portion of the annulr groove 21 so as to accomplish the sealing between the bottom surface of the annular groove 21 and the seat ring insert 23 and so as to impart fluid flow direction sliding force to the seat ring insert 23. An outer seat ring 24 is fixed by bolts 25 to the flanged portion of the inner seat ring 20 so as to prevent the seat ring insert 23 from projecting from the conical beveled surface 31. As is apparent from the above construction, the seat ring insert 23 is not fixed to the groove 21 in the inner seat ring 20 but instead is slidably movable in the fluid flow direction and is pressed to the outer surface 12 of the valve body 2 by the elastic seal member 22 in the bottom of the groove 21. Further, another seal member 29 is provided in an annular space 28 defined by a cylindrical surface 27 of the valve casing 1 and a cylindrical surface of the inner seat ring, which is in contact with a cylindrical surface 26 of the valve casing, in order to seal the space between the cylindrical surace 27 and the inner seat ring 20. Compression springs 9 which press the seat ring 3 to the right in FIG. 3 are received in a groove 10 which is substantially integral with the cylindrical surface 26. In this construction, the relation $D_1 > D_3 > D_2 > D_4 > D_5$ is established, where the diameters of the cylindrical surfaces of 26 and 27 of the casing 1 are $D_5$ and $D_1$, respectively, the average diameter of the contacting portion between the seat ring insert 23 and the external surface 12 of the valve body 2 is $D_2$, and $D_3$ and $D_4$ are defined in terms of the pressure of the inner space in the bottom portion of groove 21. More particularly, when the pressure of the inner space in the bottom portion of the groove 21 with respect to the valve axis is higher than that of the outer space with respect to it, the average diameter of the contacting portion between the elastic seal member 22 and the bottom portion of the groove 21 and or the bottom portion of the seat ring inserted member 23 is $D_3$. In this case, the sealing portion is displaced outwardly. On the contrary, when the pressure of inner space in the bottom portion of the groove 21 with respect to the valve axis is lower than that of the outer space, the average diameter of the contacting portion therebetween is $D_4$.

With the above construction, the operation of the seat ring assembly of the present invention will be described hereinafter. When the valve body 2 is closed, in case relation $P_1 > P_2$ and/or $P_3 > P_2$ is established, where the upstream pressure of the valve is $P_1$, the pressure of the valve cavity is $P_2$ and the downstream pressure of the valve is $P_3$, as before, the conical beveled surface 31 of the inner seat ring 20 is pressed by the force of the compression springs 9 and the force due to the pressure difference between $P_1$ and $P_2$ or between $P_3$ and $P_2$, that is $\pi/4(D_1^2 - D_3^2) \cdot (P_1 - P_2)$ or $\pi/4(D_1^2 - D_3^2) \cdot (P_3 - P_2)$, to the external surface 12 of the valve body 2 thereby to attain a first or primary seal of metal to metal. In general, this first seal is not completely attained because of the contact of the metal members is not perfect. There is slight leakage at this stage.

However, this slight leakage is prevented by the following secondary seal. The seat ring insert 23 is pressed to the external surface 12 of the valve body 2 by the resultant force of the elastic force of the elastic member 22 and force of the pressure difference between $P_1$ and $P_2$ or $P_3$ and $P_2$, that is, $\pi/4(D_3^2 - D_2^2) \cdot (P_1 - P_2)$ or $\pi/4(D_3^2 - D_2^2) \cdot (P_3 - P_2)$, thereby to accomplish the secondary seal of metal and synthetic resin without degrading the first seal. In this seal, the secondary seal portion of the seat ring insert 23 and the external surface 12 is positioned more outwardly with respect to the valve axis than the primary seal portion of the conically beveled portion 31 and the external surface 12.

The seal effect according to the present invention will be explained for the case where the pressure relation $P_1 < P_2$ and/or $P_3 < P_2$ is established. In this case the inner seat ring 20 is pressed to the external surface 12 by the resultant force of the force due to the compression springs 9 and the force due to the pressure difference of $D_4$ and $D_5$ owing to the difference in distance, that is, $\pi/4(D_4^2 - D_5^2) \cdot (P_2 - P_1)$ and/or $\pi/4(D_4^2 - D_5^2) \cdot (P_2 - P_3)$, since the cavity pressure $P_2$ is applied to a stepped portion 30 of inner seat ring 20. As the result, the primary seal of metal-to-metal is accomplished. Further, the seat ring insert is pressed to the external surface 12 by the resultant force of the elastic member 22 and the force due to the pressure difference between $P_1$ and $P_2$ and/or $P_3$ and $P_2$, that is, $\pi/4(D_2^2 - D_4^2) \cdot (P_2 - P_1)$ and/or $\pi/4(D_2^2 - D_4^2) \cdot (P_2 - P_3)$, thereby to accomplish the secondary seal effect of the contact of metal-to synthetic resin without degrading the primary seal.

The seat ring assembly is constructed and operated as mentioned above thereby to obtain the following advantages. First of all, the seal effect is largely enhanced by the double seal, that is, since the seal effect of metal-to-metal is effectively accomplished, the seal effect is substantially completed. Therefore, it is sufficient to seal only the slight leakage through the first seal. Consequently, the leakage is considerably reduced according to the seat ring assembly of the present invention in comparison with the conventional seal ring assemblies in which the seal effect is accomplished only by contact of synthetic resin and metal.

Further, since the seat ring insert 23 is inserted without being fixed in the inner seat ring 20 and is slidable longitudinally along the annular groove 21 and the elastic member 22 presses the seat ring insert 23, the seal effect is not substantially degraded even if the seat ring insert 23 is locally destroyed by the invasion of foreign objects. This is due to the pressure difference in each part of the assembly which thereby causes the seat ring insert 23 to uniformly contact the surface 12 of the valve body 2. Moreover, the invasion of foreign objects is prevented by the primary seal of metals. It is desirable that the seat ring insert be made of Teflon or nylon.

Under any pressure relation, the present invention makes possible a stable sealing effect since the seat ring 3 and the seat ring insert 23 are always pressed to the surface 12. Therefore, the seal effect and the durability of the ball valve or the gate valve are enhanced.

What is claimed is:

1. In a ball valve or a gate valve comprising a valve casing (1), a valve body (2) and a seat ring assembly (3) slidable in the fluid flow direction between the valve casing and the valve body, the improvement in said seat ring assembly which comprises:
   (a) a primary seal made by the direct contact between a surface (12) of said valve body and a surface (31) of said seat ring (3), and
   (b) a secondary seal made by the contact between said valve body and a seat ring insert (23), said seat ring insert being slidably inserted into an annular groove (21) longitudinally cut into said surface of said seat ring;
   (c) said ball valve having a first seal member (22) inserted between the bottom surface of said annular groove (21) and the bottom surface of said seat ring insert, said first seal member imparting a sliding force to said seat ring insert to urge said seat ring insert into contact with said surface of said valve body, and accomplish the sealing between said seat ring insert and the bottom surface of said annular groove (21).

2. A seat ring assembly claimed in claim 1, wherein a second seal member (29) is inserted into an annular space defined by a first inner cylindrical surface (27) of said valve casing and a facing cylindrical surface of said seat ring.

3. A seat ring assembly claimed in claim 1, wherein the relation $D_1 > D_3 > D_2 > D_4 > D_5$ is established, where $D_1$ designates the diameter of said first inner cylindrical surface (27) of said valve casing, which is in contact with said facing cylindrical surface of said seat ring, $D_5$ designates the diameter of a second inner cylindrical surface (26) of said valve casing, which is in contact with said facing cylindrical surface of said seat ring, $D_2$ designates the average diameter of the contacting portion between said seat ring insert (23) and said surface (12) of said valve body (2), $D_3$ designates the average diameter of the contacting portion between said first seal member (22) and the bottom surface of said annular groove (21) in said seat ring (3) and/or the bottom surface of said seat ring insert (23) when the inner pressure is higher than the outer pressure with respect to said first seal member (22), and $D_4$ designates the average diameter of the contacting portion between said first seal member (22) and the bottom surface of said annular groove (21) in said seat ring (3) and/or the bottom surface of said seat ring insert (23) when the inner pressure is lower than the outer pressure with respect to said first seal member (22).

4. A seat ring assembly claimed in claim 1, wherein the seat ring (3) comprises an inner seat ring (20) having a flange portion and an outer seat ring (24) fixed to said flange portion, said outer seat ring (24) preventing said seat ring insert from projecting from said surface (31) of said seat ring.

5. A seat ring assembly claimed in claim 2, wherein the seat ring (3) comprises an inner seat ring (20) having a flange portion and an outer seat ring (24) fixed to said flange portion, said outer seat ring (24) preventing said seat ring insert from projecting from said surface (31) of said seat ring.

6. A seat ring assembly claimed in claim 3, wherein the seat ring (3) comprises an inner seat ring (20) having a flange portion and an outer seat ring (24) fixed to said flange portion, said outer seat ring (24) preventing said seat ring insert from projecting from said surace (31) of said seat ring.